United States Patent [19]
Tedesh

[11] 3,916,563
[45] Nov. 4, 1975

[54] LAWN EDGE TRIM GUARD

[76] Inventor: George E. Tedesh, Pegan Lane, Dover, Mass. 02030

[22] Filed: July 1, 1974

[21] Appl. No.: 484,701

[52] U.S. Cl. .......................... 47/33; 47/32; 52/102; 52/169
[51] Int. Cl.² ......................................... A01G 1/08
[58] Field of Search ............. 47/33, 1, 32; 248/346, 248/156; 52/102, 155, 758 D, 102, 581; 404/8; 403/122, 136, 138, 146, 157, 361

[56] References Cited
UNITED STATES PATENTS

| | | | |
|---|---|---|---|
| 778,977 | 1/1905 | Johnson | 403/147 |
| 1,029,260 | 6/1912 | Benjamin | 403/146 X |
| 1,310,331 | 7/1919 | Ficklen | 408/8 |
| 1,977,021 | 10/1934 | Spencer | 47/33 |
| 2,533,626 | 12/1950 | Reiter | 403/159 X |
| 2,821,809 | 2/1958 | Collier | 47/33 |

Primary Examiner—Edgar S. Burr
Assistant Examiner—James R. Feyrer
Attorney, Agent, or Firm—Russell & Nields

[57] ABSTRACT

A lawn edge trim guard adapted to be made of rot and corrosive resistant material, such as injection molded plastic, is adapted to be inserted into the ground at the edge of a lawn. One member of the guard consists of an imperforate plate extending vertically into the soil to a depth beyond which grass roots and roots of garden flowers are unable to grow and propagate in a horizontal direction. Attached to the upper end of the vertical plate is a horizontal grid of shorter plates, the upper edges of which are adapted to be substantially level with the surface of the soil and which permit the grass to grow up through the interstices of the grid, the depth of the shorter plates being such as to permit the grass roots to grow and propagate beneath such plates. One edge of the longer plate is provided with a substantially coextensive flexible plate extension, the outer end of which is formed with a pair of parallel plate members providing a female socket member into which the outer end of an adjacent similar guard is adapted to be received. The first of said guards is also provided with such an outer end at the end opposite such female socket member. Such outer end is provided with at least one rounded protuberence fitting into at least one circular opening in one of said parallel plate members thus providing a rotatable joint whereby adjacent trim guard members may adjust themselves to follow the surface vertical contours of the lawn. The flexible plate extension permits adjacent guard members to be adjusted to follow the horizontal contours of the lawn. The grid itself is preferably of sufficient rigidity and strength to support the wheels of a lawn mower operating at the lawn edge.

3 Claims, 2 Drawing Figures

LAWN EDGE TRIM GUARD

BACKGROUND OF THE INVENTION

It is often desired to maintain the edge of a lawn to follow a desired contour and to prevent the grass of the lawn from propagating beyond such contour into immediately adjacent walks, flower beds or the like. Likewise, is desirable to prevent the vegetation in such beds from propagating into the adjacent lawn area. To achieve these objectives heretofore a very substantial amount of edge trimming, either by hand or by special tools, has been required. Heavy masonry or other types of barriers have been used which are expensive, make it very difficult if not impossible to trim the lawn up to the barrier by a lawn mower, and are often unsightly. These and other disadvantages of the prior art will become apparent from the description of the present invention.

SUMMARY OF THE INVENTION

The present invention accomplishes the desired results by means of a lawn edge guard consisting of a series of specifically constructed interlocking guard members made of a suitable material such as an injection molded plastic. Each guard member is provided with an imperforate vertically extending plate inserted into the soil at the edge of the lawn. The depth to which the lower edge of this vertical plate extends below the lawn surface is beyond the root propagating depth of lawn grasses and also beyond the root propagating depth of the usual flower or vegetable bed type plant. Attached at the upper edge of the vertical plate is a grid comprised of slats having a vertical depth substantially less than the root propagating depth of the lawn grasses so that the lawn grasses may grow up flourish between the plate members of the grid. Each guard member is provided at one end with a portion extending horizontally beyond the grid, said portion being of the same depth as said vertical plate and having at least one rounded prutuberance on its surface. The other end of said vertical plate is provided with a flexible joint connecting said vertical plate with a pair of parallel plate members providing a female socket member for the extension portion of an adjacent guard member. One or both plates of the female socket member is provided with an opening into which the protuberance on the horizontally projecting portion of the adjacent guard members may pivot about the ball and socket joint thus produced so that the upper surface of the guard member may follows the vertical contours of the lawn. The flexible joint between each guard member and its extension permit the adjacent guard member to be adjusted to follow any desired edge contour of the lawn.

DETAILED DESCRIPTION OF THE INVENTION

Figure 1:
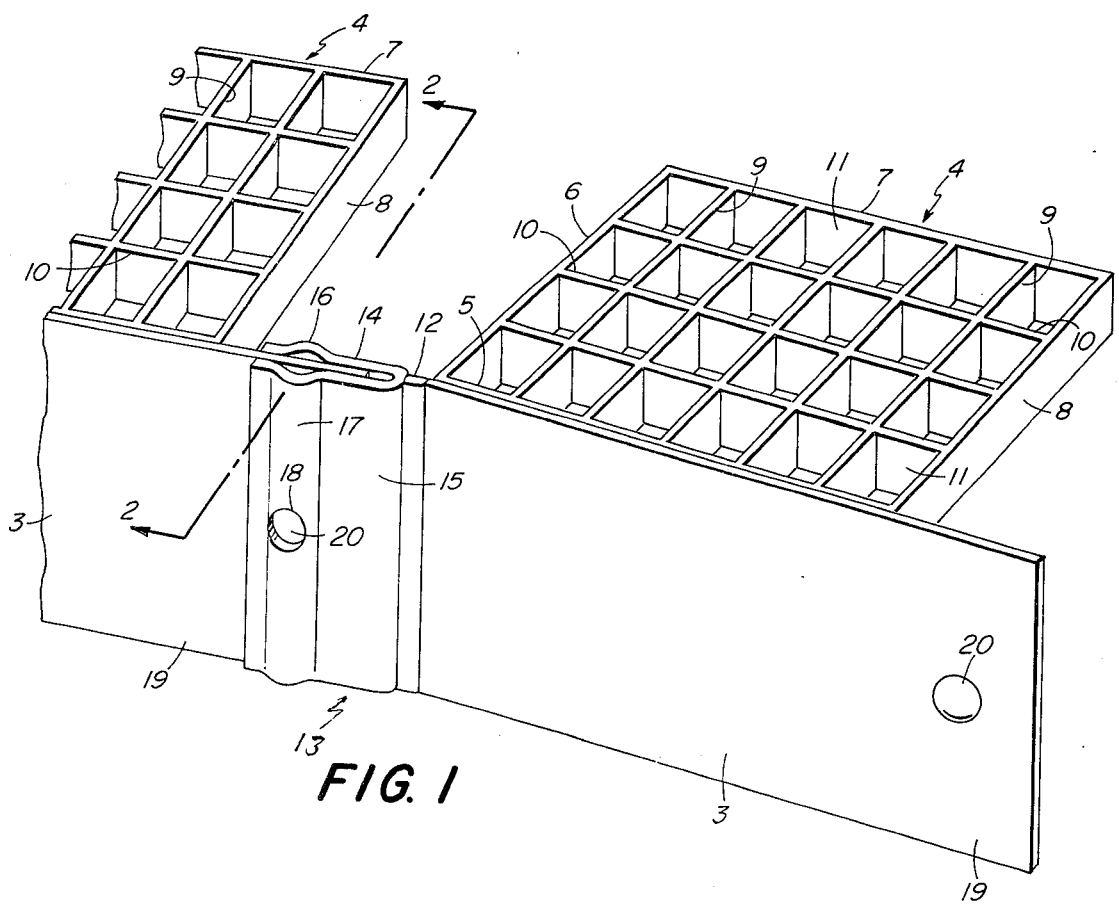
FIG. 1, is a perspective view of one element of the trim guard connected to an adjacent guard element.

As shown in FIG. 1, each element of the trim guard includes an imperforate vertical plate 3. Extending horizontally from one side of the upper end of plate 3 is a grid 4. Grid 4 is preferably made in the shape of a rectangular frame comprising vertical slats 5, 6, 7, and 8. Slat 5 is secured to the upper end of plate 3. Extending across the frame is a series of longitudinal and transverse slats 9 and 10 which intersect each other to form a plurality of openings or cells 11 which are open at the top and bottom. The members 3 through 10 are formed of a suitable rot resistant material such as an injection molded plastic material.

To one vertical edge of the plate 3 is connected a flexible strip 12 to which is also connected a generally U-shaped connector or socket 13, having a pair of parallel side wall members 14 and 15. The members 14 and 15 have outwardly, vertically extending groove forming portions 16 and 17 adjacent the outer ends of the members 14 and 15. Each of the portions 16 and 17 is formed with a rounded opening 18 approximately half way along its length. Only one such opening 18 is shown in portion 17 in FIG. 1, but it is to be understood that such an opening also exists in portion 16. Due to the above construction, the members 14 and 15 are imperforate for a predetermined distance from the bottom of socket 13 as determined by the placement of the openings 18. For a purpose to be explained, the U-shaped end of member 13 has a limited degree of spring flexibility.

The opposite end of plate 3 extends beyond the grid is extended to provide a plate section 19 provided with a rounded knob 20 on each side at such a level that, when the plate section 19 is inserted between the side wall members 15 and 16 of an adjacent element of the trim guard, the knobs 20 will snap into the openings 18 of said side wall members 15 and 16 of such adjacent element. The spring flexibility of the U-shaped member 13 retains the knobs 20 in position within the openings 18.

The distance of the extension 19 from its knobs to its outer end is sonewhat less than the depth of the U-shaped member 13 beyond its openings 18 to such a predetermined distance that adjacent trim members may rotate with respect to each other to some degree about the knobs 20 while preserving an imperforate barrier to the propagation of lawn grass roots.

Figure 2:
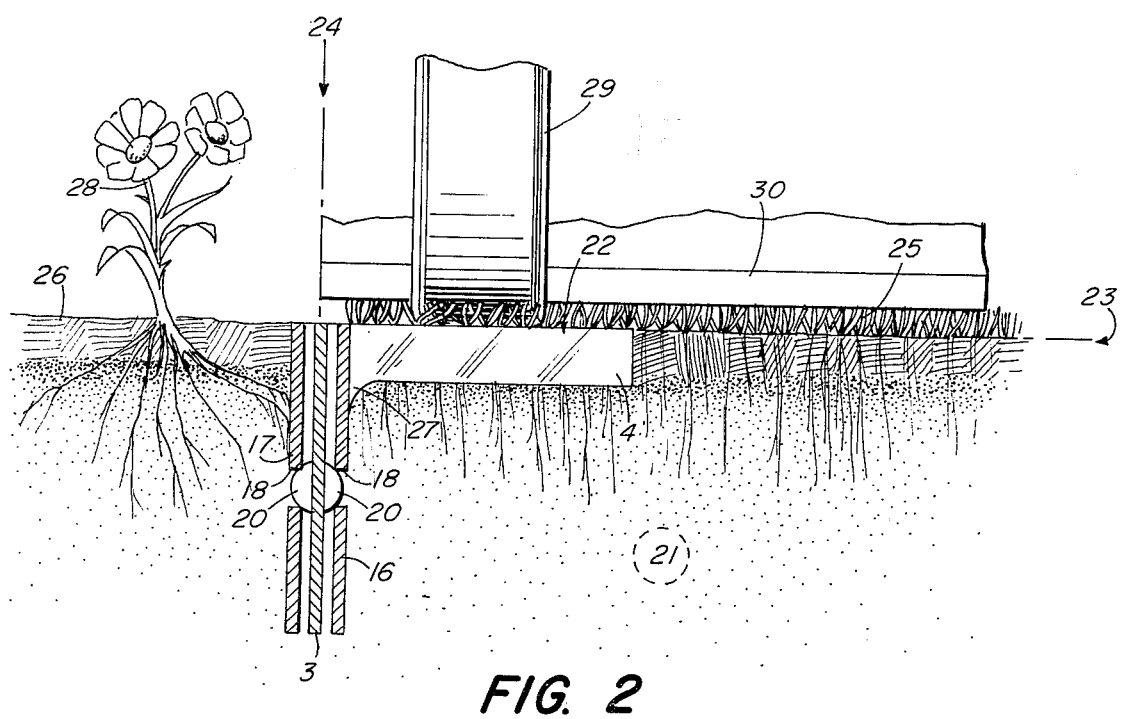
FIG. 2 is a cross-sectioned view taken along the line 2—2 in FIG. 1 of the guard as inserted into the ground at the edge of a lawn.

As shown in FIG. 2, each element of the trim guard is set into the ground 21 so that the upper edge 22 of the trim guard is substantially at the surface level 23 of the ground and the vertical plate 3 is located at the border 24 between a lawn 25 and another area such as a garden 26. The grid portion 4 is located in the lawn area so that the grass blades of the lawn area may grow freely up through the cells of the grid 4. The trim guard may be provided with a filet 27 between the grid 4 and the plate 3 for added strength.

As is well known, lawn grasses may propagate horizontally provided their roots are free to grow in a transverse direction within a limited distance from the surface of the lawn. Such distance will be termed herein "the lawn root propogating depth", and is of the order of about 2 inches. Therefore the depth of the grid 4 is about 1 inch so that the lawn grasses grow freely up through the grid 4 without substantial interference by the grid. Thus the depth of the grid 4 is made less than the lawn root propagating depth. However the depth of the plate 3 is made substantially greater than the lawn root propagating depth and, in a typical case, the depth of the plate 3 may be about 4 inches. Thus the plate 3 forms an effective barrier against the intrusion of the lawn plants into the adjacent garden area 26. The root propagating depth of such garden plants 28 as tend to intrude into the lawn area is also about of the order of the lawn root propagating depth so that the plate 3 also serves as a barrier to the intrusion of garden plants into the lawn area.

It should be noted that there are two degrees of flexibility between adjacent trim guard elements. Horizontal flexibility is provided by the flexible strip 12 and vertical flexibility is provided by the rotation of the extension 19 about the knobs 20. Therefore any series of trim guard members will adjust themselves to follow the horizontal and vertical contours of the edge of whatever lawn area is to be protected by the trim guard. Furthermore since the upper surface of the guard is at ground level, it becomes virtually invisible while maintaining a sharp and clean demarkation between the lawn and adjacent areas.

The grid 4 performs a number of additional functions. It holds the plate 3 firmly in its vertical position and resists all forces tending to dislodge plate 3 from its proper position. Also grid 4 provides a support for the whell 29 of a lawn mower whose grass-cutting blade 30 can cut the grass to the extreme edge of the lawn without danger of the mower breaking the ground at the edge of the lawn or otherwise disturbing the desired integrity of such edge.

It is to be understood that a plurality of trim guard members may be used to enclose or otherwise protect the border of any size of lawn area. While the length of the grid 4 along the plate 3 is illustrated as having six cells, it is further to be understood that any convenient number of such cells may be used in each trim guard members and that such number may be different in the various guard members used.

Further modifications in the details of the embodiment shown and described will suggest themselves to those skilled in the art within the scope of the appended claims.

What is claimed is:
1. A lawn trim guard comprising;
 a. a first guard assembly comprising a vertical imperforate plate, the vertical depth of said plate being greater than the root propagating depth of lawn grass;
 b. a grid attached to and extending along the upper edge of said plate, said grid comprising transverse and lateral slats forming a plurality of cells open at the top and bottom, the depth of said cells being less than said root propagating depth;
 c. a second guard assembly substantially like said first guard assembly and having its vertical plate extending horizontally beyond its grid;
 d. said first guard assembly having an elongated socket attached along one vertical edge of its vertical plate;
 e. said socket comprising a pair of side plates extending from the bottom of said socket along the entire height of said vertical plate and being imperforate for a first predetermined distance from said socket bottom;
 f. the extension of the vertical plate of said sceond guard assembly being received into said elongated socket of said first quard assembly to a second prdetermined distance from the bottom of said socket, said second predetermined distance being less than said first predetermined distance by an amount sufficient to permit relative vertical rotational adjustment of said extension within said socket; and
 g. detent means for retaining said extension in said socket in each position of its vertical adjustment.

2. A lawn edge trim guard as in claim 1 in which said socket is attached to the vertical plate of said first guard assembly by an imperforate flexible connecting member extending along the entire vertical length of said last named vertical plate.

3. A lawn edge trim quard as in claim 1 in which the spacing between said side plates is equal to the thickness of the vertical plate extension received into said socket, at least one of said side plates being provided with a detent recess, and the vertical plate extension of said second guard assembly being provided with a knob which is received within said recess to releasably retain said extension in said socket; the distance between said knob and the outer vertical edge of said last named vertical plate extension being less than the distance of said recess to the bottom of said socket, whereby said last named vertical plate extension is rotatable about said knob.

* * * * *